United States Patent

[11] 3,602,341

| [72] | Inventor | Karl Brand<br>Ebern, Germany |
|---|---|---|
| [21] | Appl. No. | 852,387 |
| [22] | Filed | Aug. 22, 1969 |
| [45] | Patented | Aug. 31, 1971 |
| [73] | Assignee | Kugelfischer Georg Schafer & Co.<br>Ebern, Germany |
| [32] | Priority | Aug. 28, 1968 |
| [33] | | Germany |
| [31] | | P 17 80 302.0 |

[54] AUTOMATIC SELF-ADJUSTING DEVICE FOR THE BRAKES OF MOTOR VEHICLES
1 Claim, 3 Drawing Figs.

[52] U.S. Cl. .................................................. 188/196 P,
188/79.5 GE
[51] Int. Cl. .................................................. F16d 65/54
[50] Field of Search .................................................. 188/79.5
GE, 79.5 P, 196 P, 364

[56] References Cited
UNITED STATES PATENTS

| 2,404,326 | 7/1946 | Taylor | 188/79.5 (GE) |
| 2,902,120 | 9/1959 | Nahodil | 188/79.5 (GE) X |
| 3,085,663 | 4/1963 | Jakeways | 188/196 (P) |
| 3,312,311 | 4/1967 | Dixon | 188/79.5 (GE) |
| 3,482,664 | 12/1969 | Bachmann | 188/79.5 (GE) X |

*Primary Examiner*—Duane A. Reger
*Attorney*—Stevens, Davis, Miller and Mosher

ABSTRACT: An automatic self-adjusting device to control movement of the pistons of a double-acting wheel brake cylinder to compensate for wear of brake linings and comprising a pin fixed in the cylinder with the pistons mounted on opposite ends of the pin. Friction devices are freely mounted on the ends of the pin and frictionally engage with bores in the pistons. The friction devices limit the return of the piston stroke and are displaced with respect to the pistons, against the frictional engagement, as the brake linings become worn.

PATENTED AUG 31 1971 3,602,341

INVENTOR
KARL BRAND

BY
ATTORNEYS

AUTOMATIC SELF-ADJUSTING DEVICE FOR THE BRAKES OF MOTOR VEHICLES

The present invention relates to a device for automatically adjusting the brakes of motor vehicles, which are actuated through wheel brake cylinders, thereby compensating for wear of the brake linings.

Devices similar to the above-mentioned inventive device are known. DAS 1,167,198 shows a device of this type which operates by means of a one-way ratchet which comprises two components interengaging through detent teeth, the relative movement of which is permitted in the brake applying direction but is prevented in the brake releasing direction. Adjustments which are effected through the use of teeth require, however, a substantial outlay of time and expense in both formation and assembly. When any resetting is necessary, the toothed elements must be removed. Moreover, this type of device is inclined toward damage due to breakage of the teeth.

More favorable adjusting devices are those which operate with jamming or friction devices and are likewise known as shown, for example, by German Pat. specification No. 737,702, Swiss Pat. specification No. 312,491 and Germany Gebrauchsmuster No. 1,836,929. In each of the devices described in the above-noted references, the friction device is moved, by corresponding high pressure in operation of the brake, over a distance corresponding to the wear of the brakeshoes. The brakeshoe springs of the brake are not able to overcome the friction of the friction device so that the shoes remain in their adjusted position when the brake pedal is released. These friction devices can, on exertion of a pressure which exceeds the jamming pressure of frictional engagement, be forced to a new position. However, when the friction rings are arranged outside the pressure space (see the above-mentioned German Gebrauchsmuster No. 1,836,929) there is the disadvantage that jamming of the rings in a fixed position can arise through corrosion and contamination thereby leading to the braking effect being put out of action. If the friction rings are arranged within the pressure space to engage the cylindrical wall, as for example in the above-mentioned Swiss Pat. specification No. 312,491, the honed bore can be damaged by the insertion of the piston with the friction rings thus leading to sealing failures. Also in this case there is the danger that an assembly on the back portion of a piston can be inserted too far into the cylinder so that the friction ring overlies the fluid inlet port.

The above-mentioned danger is avoided in another known construction, namely that described in German Pat. specification No. 737,702 in which the friction ring is applied not to the cylinder wall but to the inner wall of a special sleeve connected to the pressure cylinder. A pin is secured to the other pressure cylinder to project into the sleeve and carries the two stops for the friction ring. This construction, however, requires a longer overall shape of the cylinder for a given stroke and this again results in the shortening of the brakeshoe and thereby a reduction in the braking power.

The present invention overcomes all of the above-mentioned drawbacks. It relates to an automatic self-adjusting device for the brakes of motor vehicles, each wheel of which has spring-biased brakeshoes and a double-acting wheel brake cylinder employing jamming or friction devices which permit the retraction of the brakeshoes from the brake drum by the necessary clearance without overcoming the frictional engagement of said devices and which devices automatically adjust themselves when their frictional engagement is overcome.

The invention comprises the feature that these jamming or friction devices are applied to the inner wall of bores in both brake pistons into which a pin, secured by a middle flange to the cylinder wall, projects. The pin carries on each end thereof a stop for automatic adjustment of the jamming or friction device.

Preferably the pin projecting into the bores of the pistons is produced in one piece with the flange that retains it being substantially centrally disposed.

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

Figure 1:
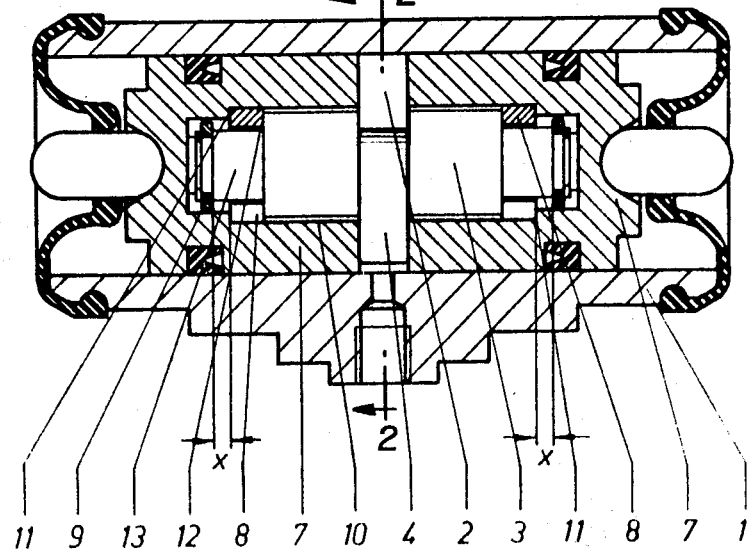
FIG. 1 is a longitudinal section through the brake cylinder taken along line 1—1 of FIG. 2.
Figure 2:
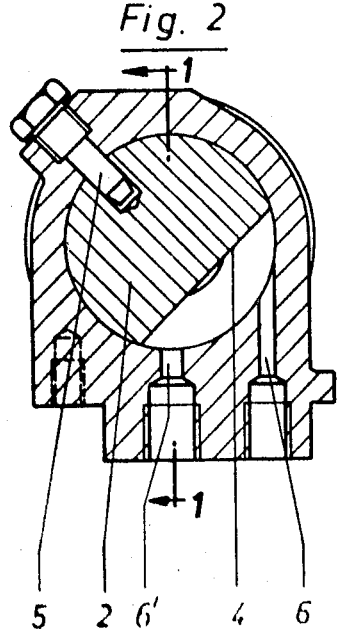
FIG. 2 is a cross section of the brake cylinder taken along line 2—2 of FIG. 1.

A pin 3 is mounted substantially in the center of the cylinder 1 by a central flange 2 and is secured in said position by a set-screw 5. A milled portion 4 of the flange 2 lies adjacent to and provides clearance for the inlet and bleeding ports 6 and 6', respectively. The pistons 7 each contain cylindrical bores 10 into which the ends of the pin 3 project. These two bores are reduced in size towards their ends by means of shoulders 11. In each piston bore there is inserted a split jamming or friction ring 8 which, before the brakeshoes become worn, bear against the shoulders 11. The pin 3 is likewise of reduced cross section towards its two ends and has a reduced diameter at the shoulders 12. On each of the end portions 13 projecting into the reduced cylinder bores there is a stop ring 9.

The dimensions of the individual components referred to above are so chosen that, on the initial assembly as shown in FIG. 1, the friction ring 8 engages against both shoulders 11 and 12 when the brakes are in the released condition. The stop ring 9 is secured to the reduced portion 13 at a distance spaced away by the clearance X. After the brakeshoes have become worn, operation of the brake will cause the friction ring 8 to bear against the stop ring 9 which causes the friction ring to be displaced away from the shoulder 11 by a distance corresponding to the wear of the brakeshoe. Upon release of the brakes, the return travel of the piston is reduced by a distance corresponding to this amount of displacement as the friction ring engages against the shoulder 12, which is fixed, and the return force of the brakeshoe springs is not sufficient to overcome the frictional engagement of the friction ring to cause its further displacement.

Figure 3:
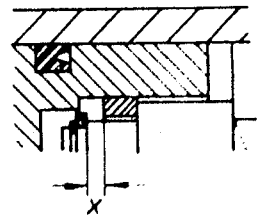
FIG. 3 is a partial longitudinal section similar to FIG. 1 but illustrating the release position of the brake after the brakeshoe has been worn.

FIG. 3 shows the arrangement in the released position under conditions where the brakeshoes have been worn and the above-mentioned displacement has been effected.

The present invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

I claim:

1. An automatic adjusting device for brakes of motor vehicles having return springs for the brakeshoes comprising a brake cylinder, pin means substantially centrally fixed in said cylinder, said pin means being a unitary member having a substantially centrally located radial flange, means for fixing said flange to the wall of said cylinder, two pistons each having an axial bore therein and mounted in said cylinder to each receive an opposite end of said pin means in said bores, friction devices applied to the inner walls of said bore, said friction devices comprising split ring members freely mounted on said pin means and frictionally engaging said bores, stop means mounted on the ends of said pin means to engage with said friction devices upon actuation of said pistons and axially displace said friction devices upon wear of said brakeshoes, a shoulder formed on each end of said pin means spaced from said stop means, shoulders formed in said bores, said friction devices initially engaging both of said shoulders but being moved away from the shoulder in said bore as said brake linings wear.